Nov. 24, 1925.

C. WARRINGTON

CHICKEN ROOST

Filed Oct. 8, 1924

1,562,814

Charles Warrington, Inventor

By C.A. Snow & Co.

Attorneys

Patented Nov. 24, 1925.

1,562,814

UNITED STATES PATENT OFFICE.

CHARLES WARRINGTON, OF CAMDEN, ILLINOIS.

CHICKEN ROOST.

Application filed October 8, 1924. Serial No. 742,447.

*To all whom it may concern:*

Be it known that I, CHARLES WARRINGTON, a citizen of the United States, residing at Camden, in the county of Schuyler and State of Illinois, have invented a new and useful Chicken Roost, of which the following is a specification.

This invention relates to a chicken roost, one of the objects thereof being to provide a structure of this character which can be detachably mounted upon suitable supports, and which has means combined therewith whereby insects can be prevented from reaching the chickens from the roost supports.

Another object is to provide a device of this character which is simple and compact in structure and can be easily kept clean.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

Figure 1:
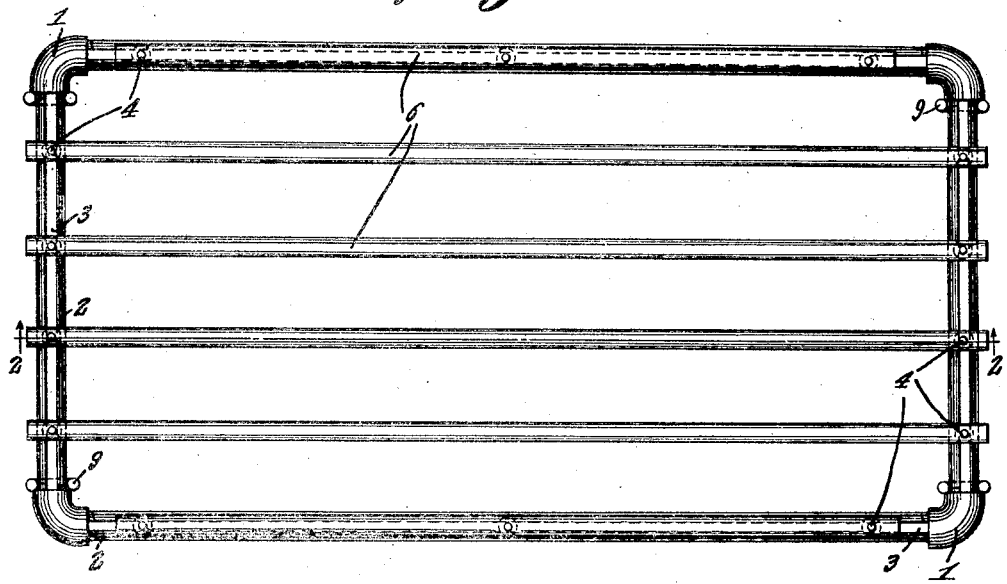
Figure 1 is a top plan view of the roost.
Figure 2:
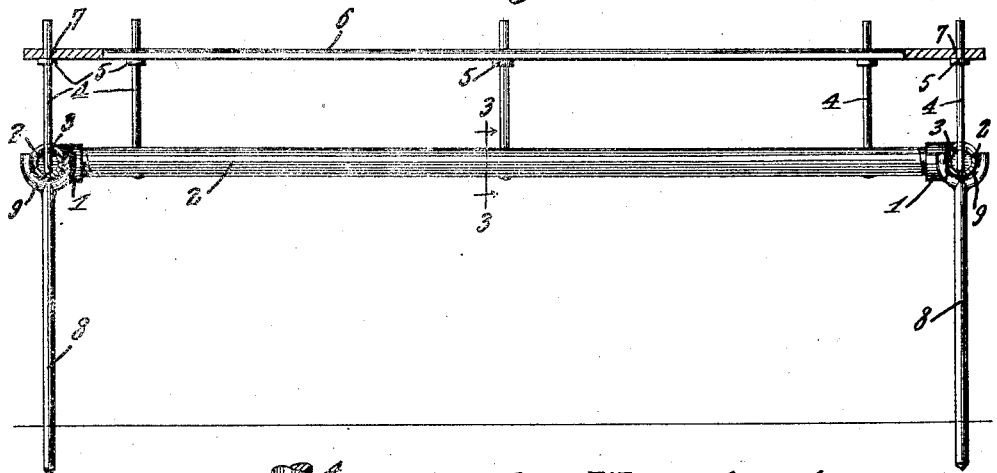
Fig. 2 is a section on line 2—2, Fig. 1.
Figure 3:
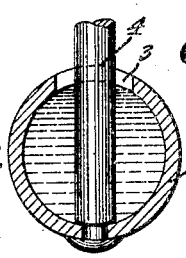
Fig. 3 is an enlarged section on line 3—3, Fig. 2.

Referring to the figures by characters of reference 1 designates elbows forming the corner portion of the frame. These elbows are connected by pipes 2 having longitudinal slots 3 in their upper portions. Riveted or otherwise secured to the bottom portions of the pipes are supporting pins 4, these pins being extended through but out of engagement with the walls of the slots 3 and being provided, near their upper ends, with supporting collars 5 or the like. The perches 6 which can be in the form of wooden strips are formed with openings 7 to receive the upper portions of the pins 4 and these perches can be mounted on the collars 5.

They can be extended in parallel relation as shown in Fig. 1 or can be disposed at any desired angles.

For the purpose of supporting the roost, standards 8 can be used. These are preferably formed of metal rods having yokes 9 at their upper ends. The frame made up of the elbows 1 and pipes 2 is adapted to rest in these yokes.

A suitable insecticide in liquid form may be placed in the frame so as to practically fill the pipes 2 and the elbows 1. Thus it will be impossible for mites or other insects to pass from the frame to the pins 4 and consequently, the perches will be kept reasonably free of them. The entire roost can be quickly removed from its supporting standards and, obviously, the entire structure can be easily and thoroughly cleaned.

What is claimed is:—

A roost including elbows, pipes split longitudinally throughout their lengths and connected by the elbows to form a frame, the splits in the pipes being in the upper portions thereof and said pipes constituting communicating liquid receptacles, pins secured to the bottom portions of the pipes and extending upwardly through the open tops thereof but out of contact therewith, perches mounted on certain of the pins and supported above and longitudinally of two of the pipes, perches mounted at their ends upon the remaining pins and bridging the frame, means for supporting the frame, and means on the pins for supporting the perches.

In testimony that I claim the foregoing as my own, I have hereto affixed my signature.

CHAS. WARRINGTON.